(12) United States Patent
Lasry

(10) Patent No.: US 12,619,098 B2
(45) Date of Patent: May 5, 2026

(54) EYEGLASSES RETENTION MECHANISM

(71) Applicant: Meyer Lasry, Spring Valley, NY (US)

(72) Inventor: Meyer Lasry, Spring Valley, NY (US)

( * ) Notice: Subject to any disclaimer, the term of this patent is extended or adjusted under 35 U.S.C. 154(b) by 0 days.

(21) Appl. No.: 18/104,600

(22) Filed: Feb. 1, 2023

(65) Prior Publication Data

US 2023/0176398 A1     Jun. 8, 2023

Related U.S. Application Data

(63) Continuation of application No. 17/357,989, filed on Jun. 25, 2021, now abandoned.

(60) Provisional application No. 63/044,448, filed on Jun. 26, 2020.

(51) Int. Cl.
G02C 5/12          (2006.01)

(52) U.S. Cl.
CPC .................................... G02C 5/128 (2013.01)

(58) Field of Classification Search
CPC .................................. G02C 5/128; G02C 5/12
USPC ....................... 351/65, 68, 69, 71–76, 78–81
See application file for complete search history.

(56) References Cited

U.S. PATENT DOCUMENTS

| | | | | |
|---|---|---|---|---|
| 1,014,116 A | * | 1/1912 | Brown | G02C 3/00 |
| | | | | 2/446 |
| 1,069,278 A | * | 8/1913 | Meyrowitz | G02C 5/12 |
| | | | | 351/75 |

| | | | | |
|---|---|---|---|---|
| 1,104,157 A | * | 7/1914 | Wells | G02C 5/12 |
| | | | | 351/72 |
| 1,130,397 A | * | 3/1915 | Green | G02C 5/12 |
| | | | | 351/72 |
| 1,174,222 A | * | 3/1916 | Bader | G02C 5/12 |
| | | | | 351/72 |
| 1,274,806 A | * | 8/1918 | Stevens | G02C 5/12 |
| | | | | 351/72 |
| 1,914,971 A | * | 6/1933 | Ferris | G02C 5/128 |
| | | | | 351/72 |
| 1,916,601 A | * | 7/1933 | Bouchard | G02C 5/128 |
| | | | | 351/74 |
| 2,036,591 A | * | 4/1936 | Marciano | G02C 5/128 |
| | | | | 351/64 |
| 2,082,084 A | * | 6/1937 | Tanasso | G02C 5/12 |
| | | | | 351/80 |
| 3,049,973 A | * | 8/1962 | Moeller | G02C 5/12 |
| | | | | 351/80 |
| 8,556,415 B2 | * | 10/2013 | Jackson | G02C 5/122 |
| | | | | 351/137 |
| 2010/0118257 A1 | * | 5/2010 | Brousseau | G02C 11/02 |
| | | | | 351/52 |

(Continued)

FOREIGN PATENT DOCUMENTS

GB          122959          2/1919

*Primary Examiner* — Darryl J Collins
(74) *Attorney, Agent, or Firm* — Dr. Hanan Farber Patent Agent Ltd.

(57) ABSTRACT

The disclosed device is eyeglasses frame that is self-maintained upon a nose using pad arms attached to a nose bridge via a spring in each of the pad arms. The spring may be activated via one or more levers. As such, a lever would be activating a torsion spring by pulling the pad arms apart to allow for a passage of a nose bridge. Once the pad arms have been placed over the desired location along a nose bridge of a wearer, or removed therefrom, the levers are released returning the pad arms to a pinched orientation with respect to the nose bridge.

14 Claims, 10 Drawing Sheets

(56)  References Cited

U.S. PATENT DOCUMENTS

2011/0116032 A1 *  5/2011  Brousseau  ............. G02C 11/02
                                                        351/52

* cited by examiner

Fig. 8
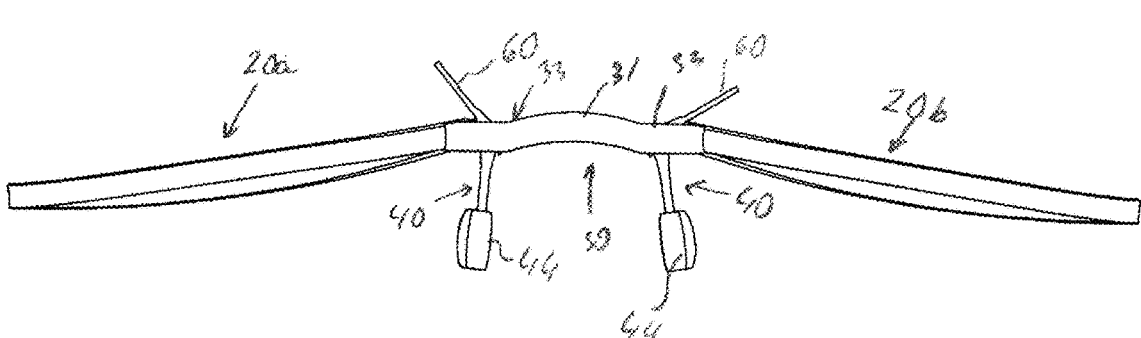

Fig. 10
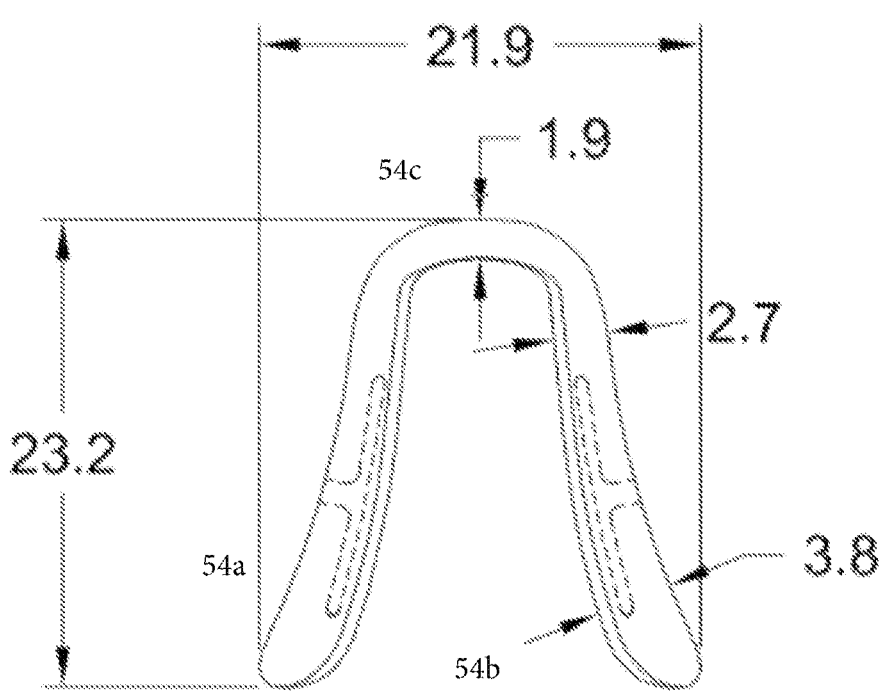
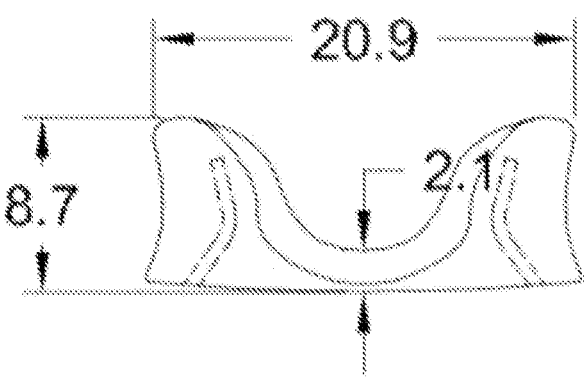

EYEGLASSES RETENTION MECHANISM

CLAIM OF PRIORITY

This application is a continuation in part of a prior non-provisional utility application Ser. No. 17/357,989 filed on Jun. 25, 2021, of the same title and inventor; and further claims the benefit of a provisional patent application No. 63/044,448, filed on Jun. 26, 2020, the contents of which are fully incorporated herein by reference.

FIELD OF THE INVENTION

The present invention relates to a novel apparatus for removably mounting eyeglasses on one's nose.

BACKGROUND OF THE INVENTION

Pince-nez style eyeglasses were originally popular in the early 20$^{th}$ century. The pince-nez style eye-glass frames comprise adjacent lenses that are separated by a bridge-like spring that exerts a force on an arch, thereby exerting a downward force on both lenses. This force causes the lenses to fold into each other and thereby pinch the nose bridge of a wearer between them. The pinching force is used to maintain the pince-nez frame mounted on a user's nose. Pince-nez remains an elegant and highly portable vision aid solution. However, this solution has enjoyed limited success due to serious drawbacks as explained below.

One major downside of traditional pince-nez is that they tent to slip off of a nose at the least alacrity of motion. Therefore, a user may only wear them when engaging in a very mild activity, such as sitting down at a desk or reading in one spot. Pince-nez that are known in the art are unsuitable for any type of physical activity, such as running, walking or even turning one's head. The slightest motion tends to displace or dislodge the frames. Besides for this significant limitation, the pinching force of existing pince-nez frames is also quite uncomfortable and cannot be worn over a nose for prolonged periods of time.

The aforementioned limitation also causes the pince-nez lenses to be quite small to keep the weight down. Larger lenses, such as those that are used in conventional eyeglasses frames with temples, will require a stiffer spring to compensate for the additional weight. While a stiffer bridge may, to some degree, solve the problem of maintaining pince-nez on a nose while engaging in mild physical activity, it also induces a greater degree of soreness and pain to the wearer's nose bridge area, which reduces the utility and appeal of a stiffer bridge embodiment.

An additional downside is that pince-nez are less than ideal for wider noses. The pinching force tends to increase with a wider nose bridge since torsion force increases as the lenses are pushed further apart. Thus, pince-nez frames available in the art are limited by the type of possible activity as well as by a particular facial feature.

SUMMARY OF THE INVENTION

It is the object of the disclosed device to provide an improved version of pince-nez eyeglasses.

It is another object of the disclosed device to provide a pince-nez frame that doesn't get displaced with slightest movement of a wearer.

It is still another object of the disclosed device to provide a pince-nez pinching mechanism that securely holds a pince-nez frame in place with increased comfort to the wearer.

It is still a further object of the disclosed device to provide a full balanced frame, where the pinching mechanism is balanced against the bridge, which extends forward of the bridge, and where the lenses balance the lateral dimension of the frame.

In one disclosed embodiment, the eyeglasses are self-maintained upon a nose using pad arms attached to a nose bridge via a spring in each of the pad arms. The spring may be activated via one or more levers. As such, a lever would be activating a torsion spring by pulling the pad arms apart to allow for a passage of a nose bridge. Once the pad arms have been placed over the desired location along a nose bridge of a wearer, or removed therefrom, the levers are released returning the pad arms to a pinched orientation with respect to the nose bridge.

The pad arms are made in a twisted and substantially flared pattern so as to capture as much of surface area on each side of a nose bridge as possible. Furthermore, a twisted configuration as shown in the figures allows for increased comfort by alleviating pressure on the skin surface of a nose that is caused by the springs. Additionally, the added space resulting from the extended pad arms, for example the twisted or zigzag configuration, and where the nose pads are slightly flared backwardly away from the frame, allowing for more distribution of tension of the spring and for greater flexibility of positioning of eyeglasses on a wearer's nose.

A bridge links the two adjacent lenses of the pince-nez. The preferred bridge extends forwardly by a distance that is proportional to the extension of the nose pads. The bridge serves the dual purpose of a) linking the adjacent lenses; and b) providing equilibrium of torque and weight to offset the downward force of the nose pads.

In another embodiment the extension of the bridge is not as pronounced. At the same time, the pad arms are substantially vertical and in parallel with the overall vertical dimension of the frames.

An additional benefit of the frames comes in forms of removable nose pads. Often the nose pads are the Achilles heel of a frame as these elements are the primary structural element of a frame that comes into direct contact with a wearer's face. There is an enormous variation of nose bridge sizes and shapes, as well as various skin qualities and conditions. Therefore, a good frame should have interchangeable nose pads to suit a wide range of potential wearers.

BRIEF DESCRIPTION OF THE DRAWINGS

FIG. 8 is the top view of the alternative embodiment showing a less forwardly pronounced bridge.

FIG. 10 demonstrates a unitary nose pad, which can also be removable.

DESCRIPTION OF THE PREFERRED EMBODIMENTS

Figure 1:
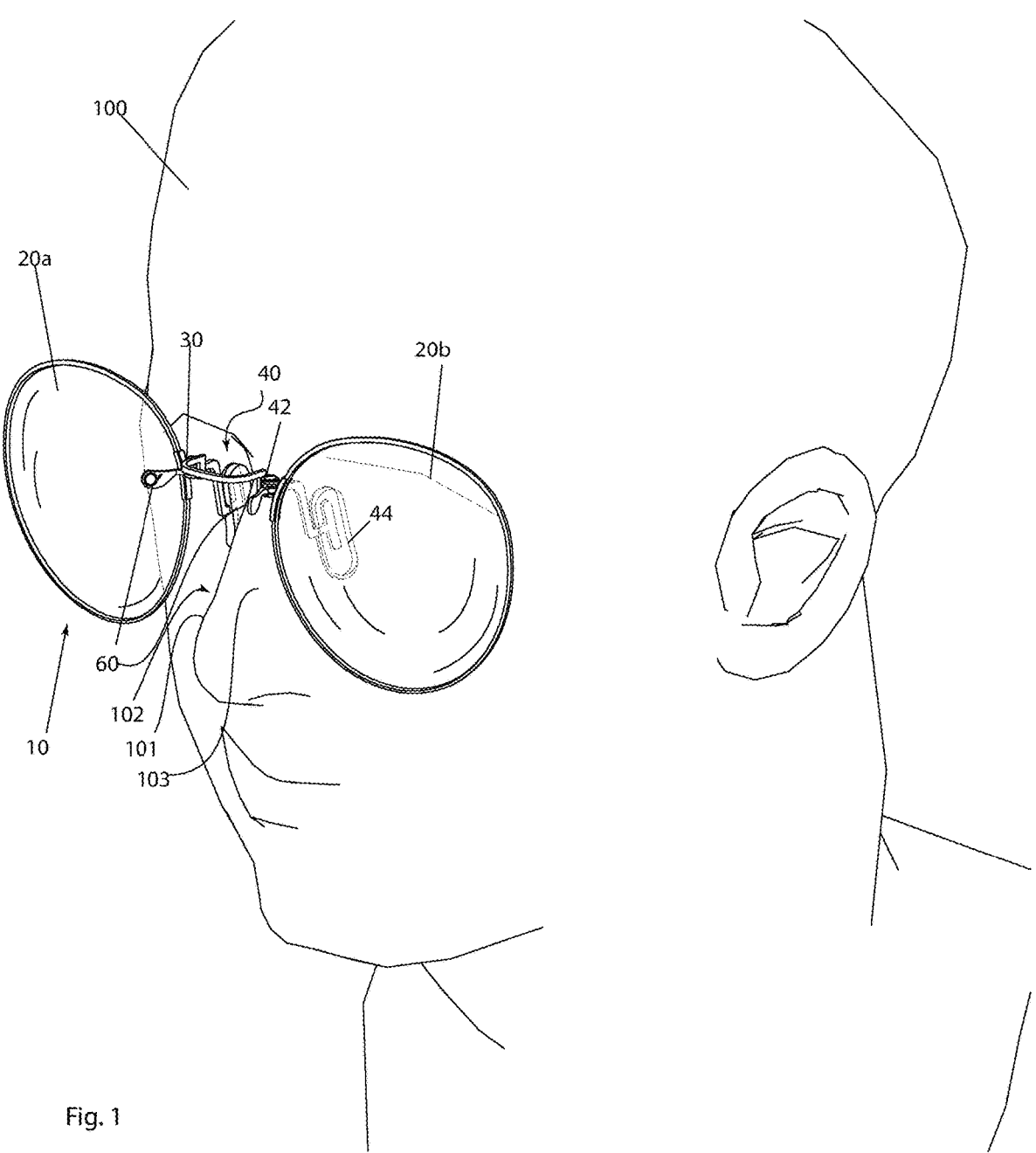
FIG. 1 is a perspective diagram showing the disclosed device within context of preferred usage.

The preferred embodiments of the present invention will now be described with reference to the drawings. Identical elements in the various figures are identified with the same reference numerals.

Reference will now be made in detail to embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto without detracting from the described utility thereof Turning now descriptively to the drawings, FIG. 1 demonstrates one contextual representation of the disclosed device. The disclosed device is the pince-nez eyeglasses 10, having adjacent lenses 20a and 20b, linked together by a bridge 30. Issuing backwardly from the inner frame 22 are nose pad assembly 40 which, when at rest, is configured to press against either side of the nose bridge 102 of a wearer 100. Levers 60 issue forwardly from the inner frame 22 and are connected through the pivot 42 to the nose pad assembly 40. The Levers 60 are configured to spread each pad 44 of the pad assembly 40 so that the pince-nez device may be mounted along or removed from the nose bridge 102. The pince-nez device 10 shown in FIG. 1 appears to have a rim. However, all concepts disclosed in FIG. 1 and in later figures are just as applicable to rimless frames, and frames of various geometric shapes, such as square, circular, oval, triangular, pentagonal, or any other shape of the lenses 20a and 20b, as well as all different styles of frames, such as quarter frames, half rims, etc.

Figure 2:
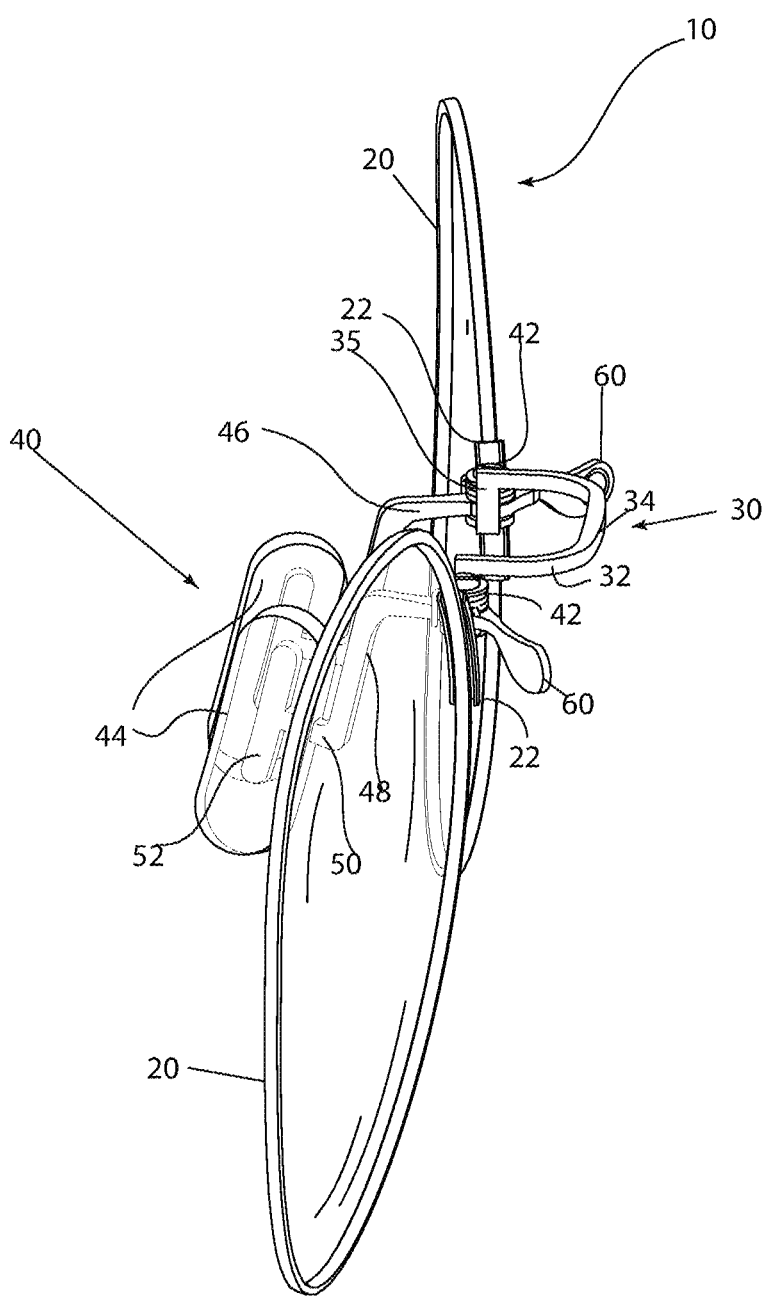
FIG. 2. is a perspective diagram of the disclosed device.

FIG. 2 describes many of the novel utilities of the present invention. Shown are the lenses 20a and 20b that are disposed adjacently and are separated by a bridge 30. The bridge 30 is preferably comprised of parallel forward rods 32 issuing forwardly from the connection point 3.5 and lined by a horizontal rod 34. The combination of forward rods 32 and the horizontal rod 34 forms a middle portion of the bridge 30. The combination of forward rods 32 and the horizontal rod 34 may instead be a single arching rod as shown in FIG. 8. The parallel forward rods 32 and the horizontal rod 34 may be connected at a point or transition elliptically as shown. The connection points 35 attach the bridge to the inner frame 22. The inner frame 22 in turn also holds the lenses 20a and 20b.

Still referring to FIG. 2, the bridge 30 serves a dual purpose. The first purpose is to connect adjacent lenses 20a and 20b together to form eyeglasses. The second purpose is to offset the weight of the nose pad assembly 40. The nose pad assembly 40 comprises a first rod 46 issuing rearwardly from the pivot 42. A second rod 48 issues at an angle from the free end of the first rod 46 and runs downwardly in a moderate diagonal direction away from the axis of the lenses 20. Issuing rearwardly from a free end of the second rod 48 is a third rod 50, which is terminated by a nose pad attachment point 52 inside the actual nose pad 44. The first, second, and third rods 46, 48 and 50, respectively connecting to the two nose pads 44 of the nose pad assembly 40, are in parallel and set apart configuration with respect to each other.

The architecture created by the first, second, and third rods 46, 48 and 50, respectively, and/or the slight diagonal disposition of the second rod 48 is intended to a) place the nose pads 44 at some distance from the crest 101 on the nose bridge 102 along a side of a nose bridge 102; b) spread the pressure exerted by the pivot 42 over a wider area and thus reduce some of the discomfort felt in the nose bride area by a wearer 100; and c) serve as a weight and torsional offset to the bridge 30. The zigzag pattern produced by the first, second, and third rods 46, 48 and 50, respectively, may also be replaced by a downward arch issuing rearwardly from the pivot 42 and proceeding downwardly in substantially the same direction as the zigzag pattern shown. Depending on the desired style the zigzag pattern may contain additional or fewer twists, as long as the basic architecture, disposition of the nose pads 44 and the counterbalance to the bridge 30 are preserved.

Figure 3A:
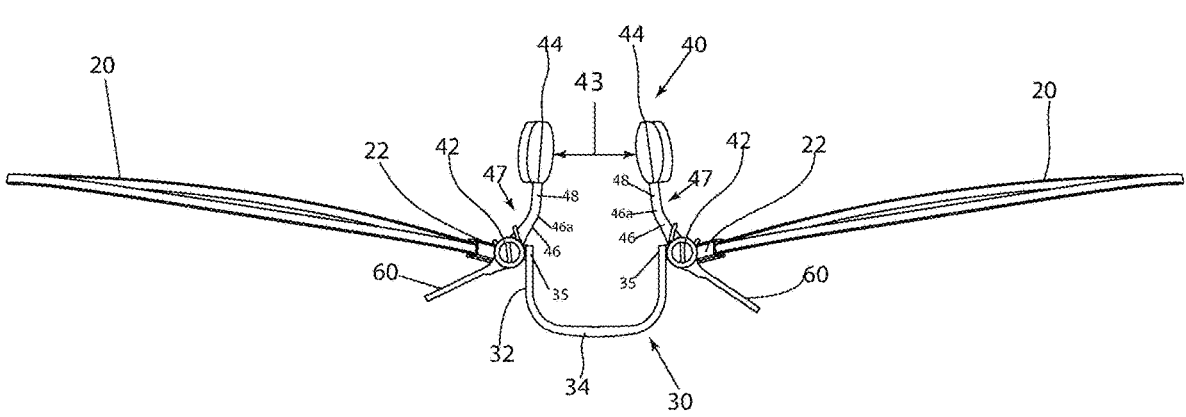
FIGS. 3A and 3B demonstrate the displacement mobility of the nose arms.
Figure 3B:
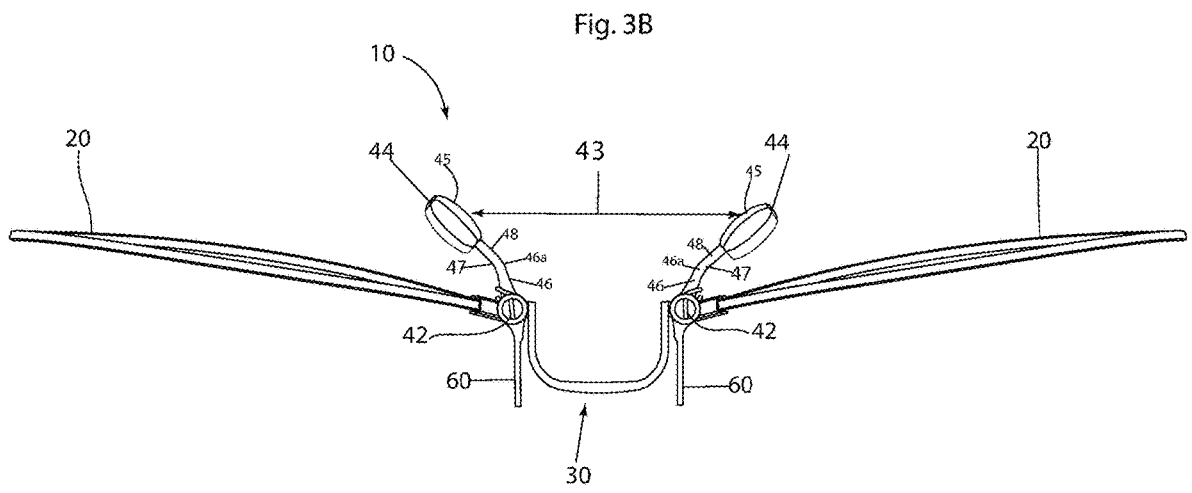

FIGS. 3A and 3B illustrate several important novel features of the disclosed device. Shown are lenses 20a and 20b adjacently and co-linearly linked by a bridge 30. The bridge 30 connecting at connection points 32 to pivots 42 of each inner band 22 that secures each lens 20a and 20b. The components of the bridge 30, namely the forward rods 32, linked by a horizontal rod 34 extend forward from the connection points 35. Two parallel arms 47, where each parallel arm 47 is attached to a pivot 42. Each arm having a lever 60 forwardly extending from the pivot 42 and a first rod 46 rearwardly extending from the pivot 42. Each arm 47 having a second rod extending at an angle from the free end of the first rod 46 at the point 46a. As illustrated in FIG. 2, the second rods 48 angle downward from the points 46a. FIGS. 3A and 3B demonstrate that the opposing rods 48 are angling away from each other at points 46a. The bend in the arms 47 that is illustrated in FIGS. 3A and 3B affords for a more concentrated and flush attachment of the pads 54, when the gap 43 is near its narrowest point, which is especially suitable for narrower nose bridges 102. Furthermore, the angle of the second rods 48 orients the attachment face 4.5 of each pad 44 to be more parallel with the sides of the bridge 102. The same bend in the arms 47 also leads to a generous gap 43 shown in FIG. 3B, which assists in easily mounting and dismounting of the disclosed device 10 from a wearer's nose 102 and adjusting the position of the disclosed device 10 along the length of a wearer's nose. The large variation of the gap 43 also accommodates a greater variety of nose bridge sizes without sacrificing comfort and effectiveness. In FIG. 3A the arms 47 are at a default or at rest position, with the gap 43 being its narrowest and the levers 60 facing away from each other. In FIG. 3A the levers are activated (by utilizing the fingers of a wearer) and pivoted towards the bridge 30, which causes the gap 43 to widen. Once the desired maneuver is achieved, the torsion spring in the pivots 42 causes the levers 60 to return to the position shown in FIG. 3A when they are released.

Figure 4A:
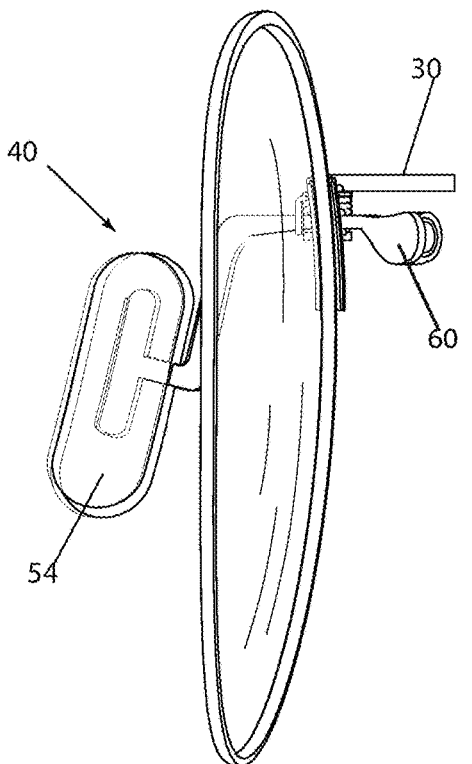
FIGS. 4A and 4B disclose the right and left views of the disclosed device.
Figure 4B:
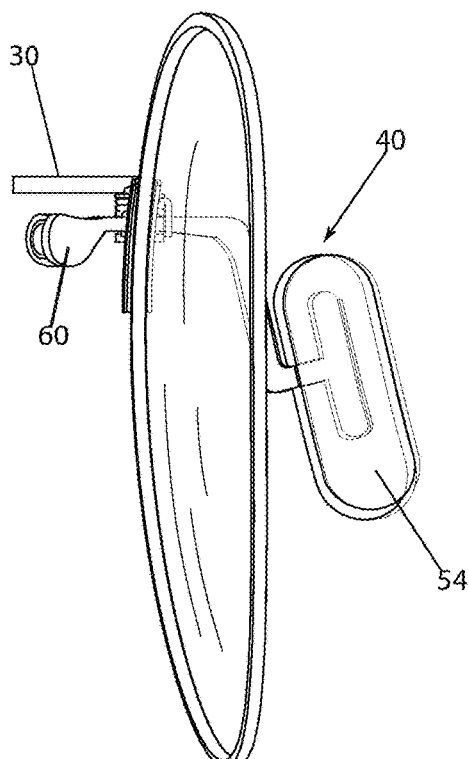
Figure 5:
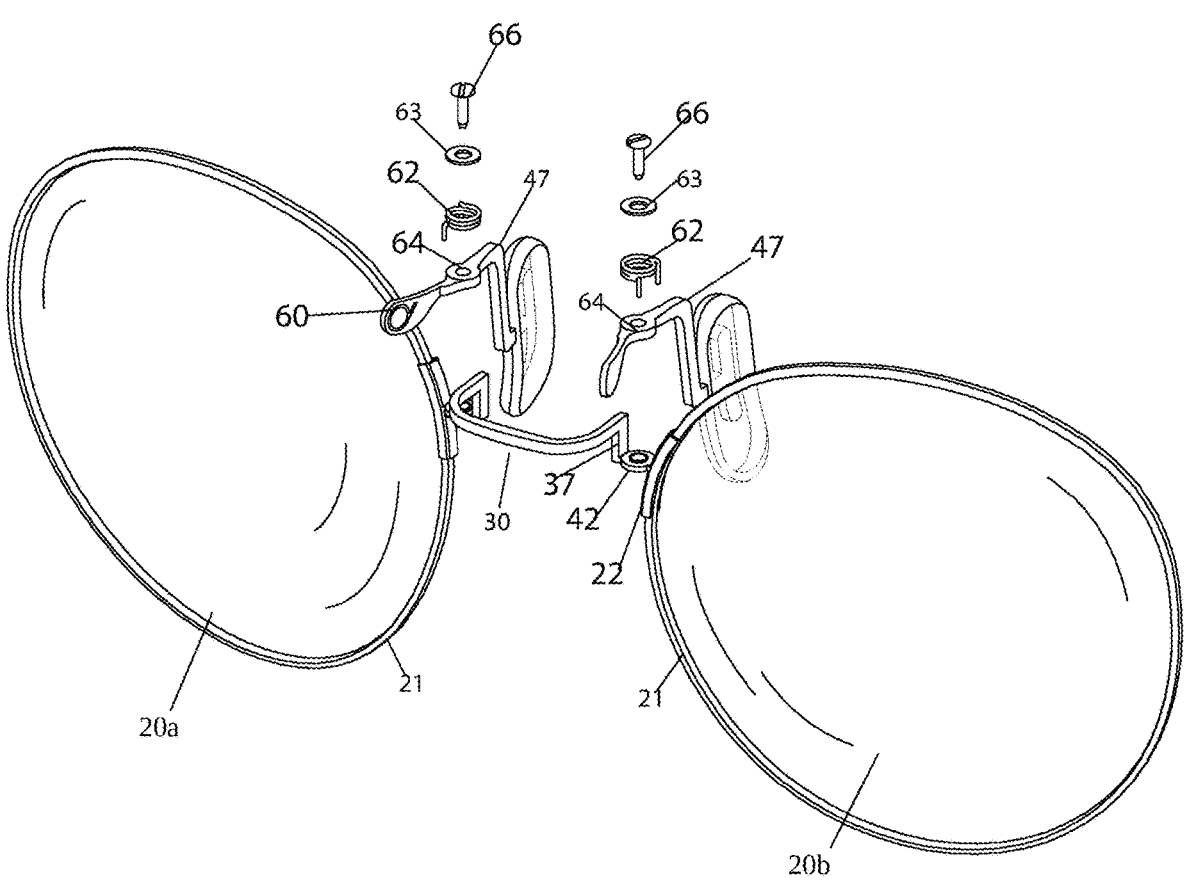
FIG. 5 is an exploded diagram demonstrating the disclosed device.

FIGS. 4A and 4B are right- and left-hand views, respectively, of the disclosed device 10. Shown are the nose pads 54 oriented diagonally away from the axis of the lenses 20a and 20b. The bridge 30 protrudes forward of the frame above the levers 60. The levers 60 are shaped in a paddle-like form that offers optimal snag area for a user's finger tips despite the small profile of the lever component 60.

Figure 6:
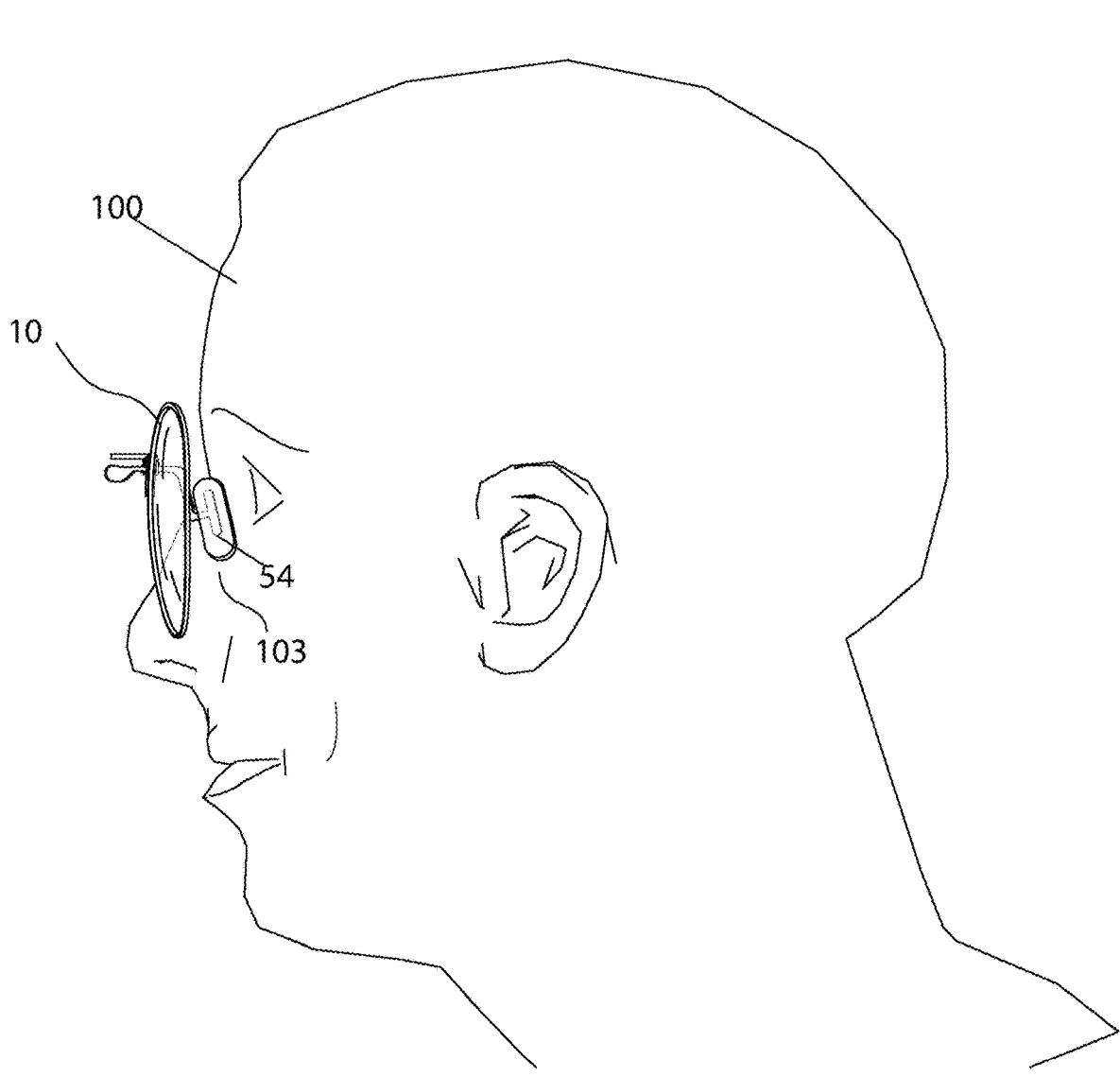
FIG. 6 is a sideview diagram showing the disclosed device within context of preferred usage.

FIG. 6 demonstrates a sideview of the device 10 in the context of the preferred usage. The position of the nose pads 54 allows them to be placed across the side of a nose bridge 103, thereby capturing as much as of surface area as possible. This in turn leads to an attachment that is tolerant to motion and activity, permitting the device to be worn while engaging in various forms of physical activity.

Figure 7:
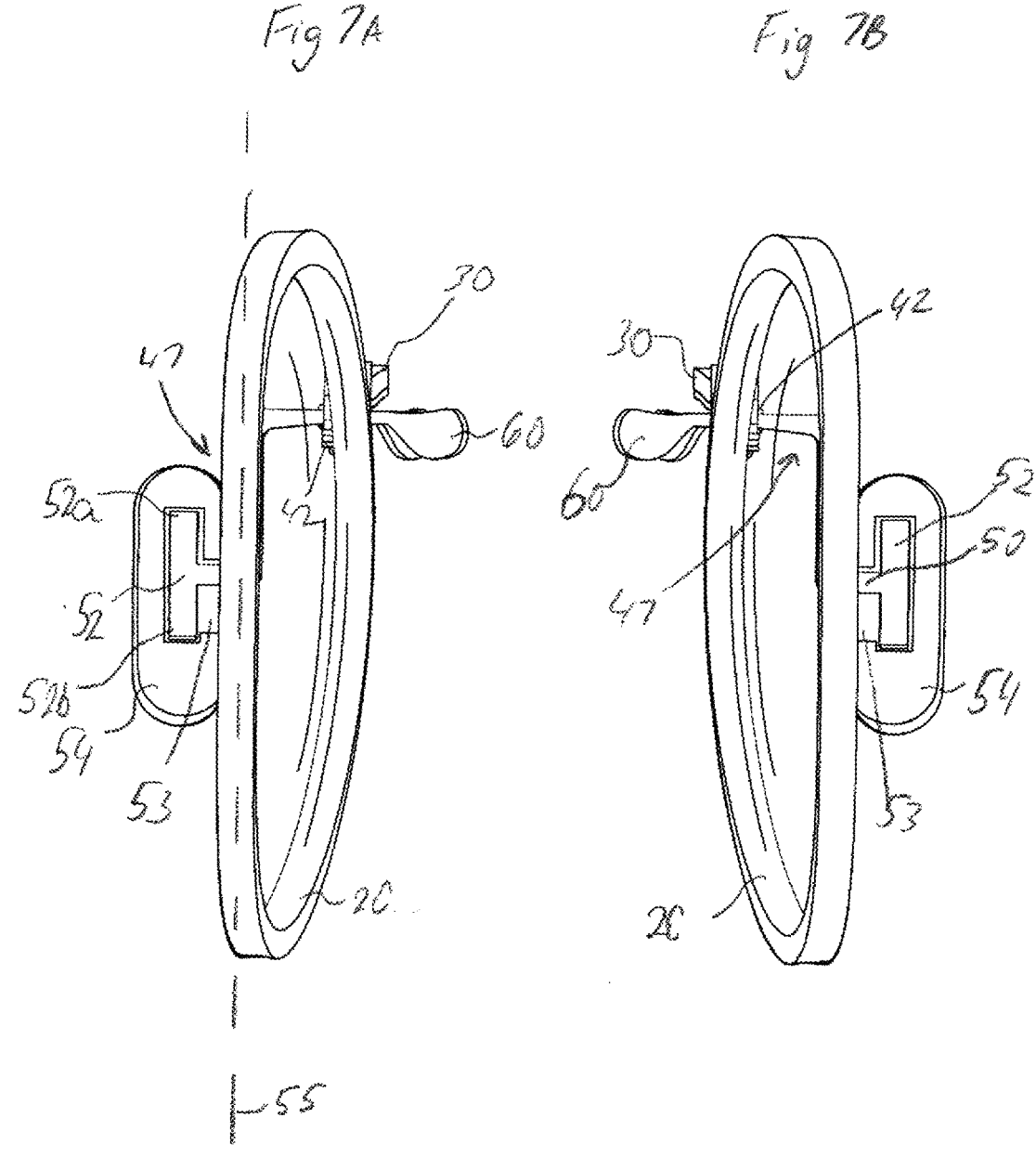
FIGS. 7A and 7B is a sideview diagram showing the disclosed device within context of preferred usage demonstrating the alternative embodiment of a less pronounced bridge and vertical nose arms.

FIGS. 7A and 7B are side views of the disclosed eyeglasses frame 10 showing frames 20 20a and 20b connected by a bridge 30. Unlike the bridge shown in prior figures, the bridge 30 in FIGS. 7A and 7B is shown as a single curving arch, that slightly protrudes forward from the frames 20a and 20b. The bridge 30 may also be a completely straight and non-arching or arching vertically or arching towards the wearer. Also shown are the pad arms 47 issuing rearwardly from the pivot 42 and forwardly from the pivot 42 in the form of the levers 60.

Notably different are the attachment points 52, which form a perpendicular rod attaching to the free end of the third rods 50. The attachment points 52 may have the upper 5 end 52a and the lower end 52b. Alternatively, either the upper or the lower end 52a or 52b may be left out on a particular embodiment. The attachment points 52 are substantially parallel with the vertical dimension 55 (x-axis) of the frames 20. When worn on a user's nose, the less forwardly pronounced bridge 30 and the vertical pad arms 47 balance each other in terms of weight. Shown one the pads 54 is an elongated opening 53.

FIG. 8 show the disclosed embodiment 10 having frames 20a and 20b joined by a bridge 30. The bridge is a single curving rod with a forward leaning section 31 and straight portions 30. Alternatively, the bridge 30 may form a single uninterrupted arch.

Figure 9:
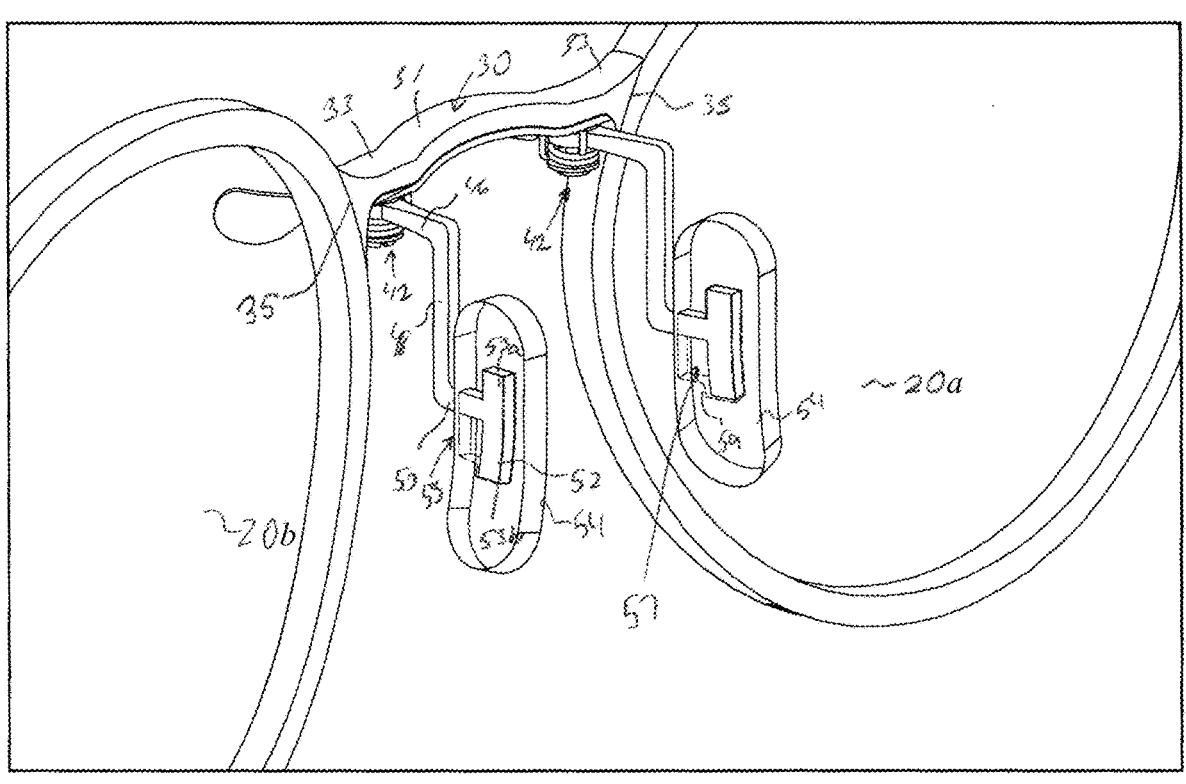
FIG. 9 is a close-up view of the removable nose pads.

FIG. 9 demonstrates the removable pads 54. The attachment point 52 is threaded into the elongated opening 53, preferably using either the upper end 52a or the lower end 52b as the leading member. Once the leading member clears the inner ridge 59, the pad is pulled vertically up (or down depending on which end 52a or 52b is the leading member) and over the trailing end of the attachment point 52. The size of the elongated opening 53 and the inner elongated channel 57 while larger than shown in FIGS. 1-6 can be kept to a minimum as the pads 54 are preferably made out of flexible material that can easily stretch to increase the necessary opening. The removable nose pads enable the wearer to replace the nose pads with a nose pad of different shape, size or design, which dimensionally may be more appealing or suitable to the particular wearer. The disclosed embodiment of the frame 10 may come prepackaged with nose pads that are of several different shapes and sizes, or simply in multiples of the same size, but having varying levels of stiffness or frictional coefficient. FIG. 10 demonstrates a unitary pad 54 having 2 pad portions 54a and 54b, linked together by a bridge portion 54c. Preferably, the unitary pad 54 is preferably removable, and is used to increase the grip of the frames around a nose bridge of a wearer, which also increasing the comfort level of the frames shown, for example, by spreading the pressure of the pads 54 and the weight of the frames 20a and 20b over a greater area.

Although this invention has been described with a certain degree of particularity, it is to be understood that the present disclosure has been made only by way of illustration and that numerous changes in the details of construction and arrangement of parts may be resorted to without departing from the spirit and the scope of the invention. While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, devices and components, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest ha such feature is required or necessary unless expressly so stated. Still further, exemplary or representative values and ranges may be included to assist in understanding the present disclosure, however, such values and ranges are not to be construed in a limiting sense and are intended to be critical values or ranges only if so expressly stated. Parameters identified as "approximate" or "about" a specified value are intended to include both the specified value and values within 10% of the specified value, unless expressly stated otherwise. Further, it is to be understood that the drawings accompanying the present disclosure may, but need not, be to scale, and therefore may be understood as teaching various ratios and proportions evident in the drawings. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention the inventions instead being set forth in the appended claims, as currently written or as amended or added in the future. Descriptions of exemplary methods or processes are not limited to inclusion of all steps as being required in all cases, nor is the order that the steps are presented he construed as required or necessary unless expressly so stated.

What is claimed:

1. A pince-nez vision aid device comprising:
   two frames disposed adjacently; said frames separated by a bridge; said bridge having a middle portion; a nose pad assembly comprising two arms; each of said two arms pivotably attaching to said bridge on either side of said middle portion;
   wherein said arms extend rearwardly from points of pivotal attachment of said arms to said bridge, wherein said arms attach levers issuing forwardly from the points of attachment, two springs;
   wherein said pivotal attachments are respectively springloaded by the springs, wherein the springs exert pressure on the nose bridge of a user proportional to the angular extension of the arms;
   a plurality of removable and replaceable nose pads of different sizes; wherein each said arm is configured to receive a nose pad, selected from the nose pads, by slidably threading an attachment member terminating said arm into an opening in the selected nose pad, wherein all the nose pads when attached to the respective attachment members are entirely disposed rearward of a plane defined by the two frames;
   wherein when the levers are pressed, the rearward extension of the arms provides an adjustable gap between the attachment members terminating the arms to accommodate the nose pads of different sizes and corresponding nose bridges of different widths, wherein at least partial compensation of the pressure is achievable by selection of nose pads of larger size and greater surface area.

2. The vision aid device of claim 1, wherein said middle portion of said bridge extending forward and said arms extending rearward serve as counterweights for each other.

3. The vision aid device of claim 1, wherein said arms include respective sections extended rearwardly and downwardly to provide a significant gap to receive the nose pad.

4. The vision aid device of claim 1, wherein downward portions of said two arms are angled away from each other.

5. The vision aid device of claim 1, further comprising lenses held in place by said bridge and said frames.

6. The vision aid device of claim 1, wherein said nose pad is manufactured as a single element to form a unitary pad having right and left nose pad sections and a nose pad bridge section connected therebetween.

7. The vision aid device of claim 1, wherein said arms extend rearward and angle away from a vertical axis of said frames.

8. The vision aid device of claim 1, wherein said arms include sections extending rearwardly then downwardly and further include a section extending again rearwardly.

9. A method of constructing a pince-nez vision aid device to accommodate different widths of nose bridges of different users, the method comprising:

disposing two frames adjacently; separating said frames by a bridge having a middle portion; providing a nose pad assembly having two arms; pivotably attaching said arms to said bridge on either side of said middle portion; wherein said arms extend rearwardly from points of pivotal attachment of said arms to said bridge, wherein said arms attach levers issuing forwardly from the points of pivotal attachment;

providing a plurality of nose pads of different sizes which are removable and replaceable;

configuring the arms to receive the nose pads by slidably threading attachment members terminating the arms into respective openings in the nose pads, wherein all the nose pads are entirely disposed rearward of a plane defined by the two frames;

providing an adjustable gap between the attachment members terminating the arms, by the rearward extension of the arms, when pressing the levers to accommodate the nose pads of different sizes and corresponding nose bridges of different widths;

spring-loading said pivotal attachments thereby exerting pressure on the nose bridge of the user proportional to the angular extension of the arms; and selecting a pair of nose pads from the nose pads of different sizes to accommodate a nose bridge width of a particular user;

at least partially compensating for the pressure by selection of nose pads of larger size and greater surface area.

10. The method of claim 9, the method further comprising:

pressing on the levers to provide the gap sufficient to receive the selected nose pads.

11. The method of claim 9, further comprising:

balancing said middle portion of said bridge extending forward and said arms extending rearward, thereby serving as counterweights for each other.

12. The method of claim 9, further comprising:

angling outward from each other downward extending sections of the two arms.

13. The method of claim 9, wherein said arms include sections extending rearwardly then downwardly and again rearwardly.

14. The method of claim 9, further comprising:

manufacturing as a single element at least one of the nose pads to form a unitary pad having right and left nose pad sections and a nose pad bridge section connected therebetween.

\* \* \* \* \*